(12) United States Patent
Hashimoto

(10) Patent No.: US 6,952,002 B2
(45) Date of Patent: Oct. 4, 2005

(54) IMAGE PROCESSING APPARATUS

(75) Inventor: Seiji Hashimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 10/195,402

(22) Filed: Jul. 16, 2002

(65) Prior Publication Data
US 2003/0025065 A1 Feb. 6, 2003

(30) Foreign Application Priority Data
Jul. 18, 2001 (JP) ........................... 2001-218612

(51) Int. Cl.$^7$ ................................. G01J 1/32
(52) U.S. Cl. ............................ 250/205; 250/214 AL; 250/238
(58) Field of Search .................... 250/205, 214 AL, 250/214 B, 214 C, 214 R, 238, 555; 356/71; 382/135, 115; 348/244

(56) References Cited

U.S. PATENT DOCUMENTS

| | | | |
|---|---|---|---|
| 4,635,126 A | 1/1987 | Kinoshita | 358/228 |
| 4,910,597 A | 3/1990 | Harada et al. | 358/213.15 |
| 4,914,519 A | 4/1990 | Hashimoto et al. | 358/213.18 |
| 5,162,912 A | 11/1992 | Ueno et al. | 358/213.16 |
| 5,719,950 A * | 2/1998 | Osten et al. | 382/115 |
| 5,923,367 A | 7/1999 | Tsunekawa et al. | 348/207 |
| 5,949,478 A | 9/1999 | Kunishige | 348/96 |
| 6,141,436 A * | 10/2000 | Srey et al. | 382/124 |
| 6,271,880 B1 * | 8/2001 | Kameshima et al. | 348/244 |
| 6,483,095 B1 * | 11/2002 | Iwaki | 250/205 |
| 2002/0012053 A1 | 1/2002 | Yoshida | 348/243 |

FOREIGN PATENT DOCUMENTS

| | | | |
|---|---|---|---|
| CA | 5889883 | 3/1999 | G06K/9/00 |
| CM | 1221161 | 6/1999 | |
| EP | 0792066 A2 | 9/1995 | |
| JP | 61-112472 | 5/1986 | |
| JP | 62-2770 | 1/1987 | |
| JP | 1-156668 | 10/1989 | |
| JP | 5-207219 | 8/1993 | |
| JP | 9-22071 | 1/1997 | |
| JP | 11-185016 | 7/1999 | |
| JP | 20000353236 | 12/2000 | |
| JP | 2001-45294 | 2/2001 | |
| JP | 2001-223861 | 8/2001 | |
| JP | 2001230976 | 8/2001 | |
| KR | 99002282 | 1/1999 | |
| WO | WO 95/26013 | 9/1995 | |

OTHER PUBLICATIONS

Optical Technology Handbook, p. 318, section 4,1,3, published by Asakura Shoten, Aug. 24, 1952.

European Search Report in Application No. 02255022.2–2202–(Jan. 8, 2004).

Office Action in Korean bearing No. 10–2002–0041857 dated Jun. 22, 2004.

* cited by examiner

*Primary Examiner*—David Porta
*Assistant Examiner*—Seung C Sohn
(74) *Attorney, Agent, or Firm*—Fitzpatrick, Cella, Harper & Scinto

(57) ABSTRACT

An image processing apparatus is provided which includes: a sensor unit having a plurality of photoelectric conversion portions for converting light from an object into charges and accumulating the charges; a sensor drive circuit for controlling an accumulation time of the charges in the sensor unit; a light source for irradiating light on the object; a temperature detection circuit for detecting ambient temperature of the sensor unit; and a control circuit for controlling the sensor drive circuit and the light source according to an output of the temperature detection circuit.

5 Claims, 4 Drawing Sheets

IMAGE PROCESSING APPARATUS

BACKGROUND OF THE INVENTION

1. Field of the Invention

The present invention relates to an image processing apparatus having a sensor unit for converting light from an object into charges and accumulating the charges and a sensor drive circuit for controlling an accumulation time of the charges in the sensor unit.

2. Related Background Art

In an image processing apparatus for processing an object such as a finger or a barcode, as long as it is within a range of hand vibrations, the longer an exposure time is, the less sensitivity of a sensor can be used and the lower may be made an illuminance of light such as an LED beam irradiated on an object. Thus, power consumption of the image processing apparatus can be reduced.

However, if the exposure time is extended, a sensor dark current increases in case of that ambient temperature is high or in case of that when the apparatus is placed on, for example, a front board of an automobile, then temperature inside the apparatus rises due to heating by the direct sunlight. That is, noises increase and signals of a finger or a barcode cannot be separated.

In addition, in an apparatus for detecting a fingerprint from light transmitted through a finger, shading occurs in a signal generated by the light transmitted through the finger. Influence of noises due to a dark current is large in a central part of the finger because a signal level decreases more in that part than in a peripheral part of the finger.

SUMMARY OF THE INVENTION

The present invention has been devised in view of the above-mentioned drawbacks, and it is an object of the present invention to provide an image processing apparatus that is capable of processing an image of a barcode or a finger without being affected by ambient environmental conditions.

In order to attain the above object, as an embodiment of the present invention, there is provided an image processing apparatus which comprises: a sensor unit having a plurality of photoelectric conversion portions for converting light from an object into charges and accumulating the charges; a sensor drive circuit arranged to control an accumulation time of the charges in the sensor unit; a light source for irradiating light on the object; a temperature detection circuit arranged to detect ambient temperature of the sensor unit; and a control circuit arranged to control the sensor drive circuit and the light source according to an output of the temperature detection circuit.

Note that intensity of light irradiated on an object can be regulated by an irradiance (illuminance) representing a radiant flux (W) incident on a unit area of the object. (Optical Technology Handbook, page 318, section 4. 1. 3, published by Asakura Shoten).

Other objects and features of the present invention will become apparent from the following detailed description and accompanying drawings.

DESCRIPTION OF THE PREFERRED EMBODIMENT

The present invention will be hereinafter described.

Figure 1:
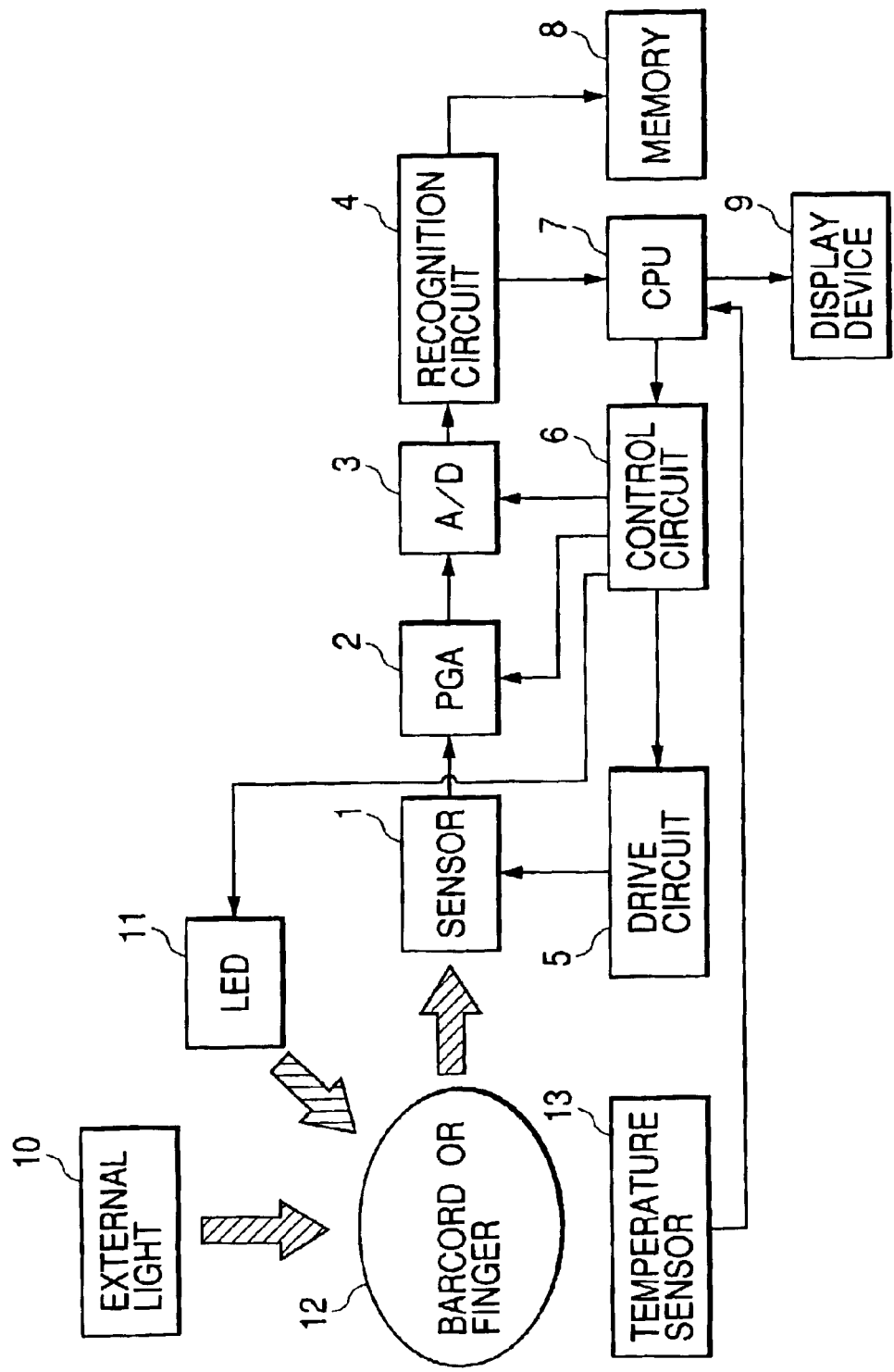
FIG. 1 is a block diagram showing a structure of an embodiment of an image processing apparatus of the present invention.

FIG. 1 is a block diagram showing a structure of an embodiment of an image processing apparatus of the present invention. An example of an object 12 includes a two-dimensional barcode or a fingerprint. External light 10 irradiated on the object 12 is sunlight, guide light, or the like. If the external light is dark, light from a light emitting element, which is an LED 11 in this context, is irradiated. Here, the light 10 and the light from the LED 11 are irradiated on the object 12, and it is possible to change intensity of light by turning on or off the LED 11. However, a light source may be constituted by one light emitting element such as an LED or by a plurality of light emitting elements such as LEDs that can change a light amount. In addition, when brightness of the external light 10 can be controlled, only the external light 10 may be used without providing the LED 11.

Light reflected from or transmitted through the object 12 is made incident on a sensor 1 functioning as image pick-up means and is photoelectrically converted to a signal by the sensor 1. The signal is then inputted in a PGA (programmable gain amplifier) for controlling a level of an analog input signal so as to extend over an entire range of a resolution of an A/D converter and is analog-digital converted by the A/D converter 3. An output from the A/D converter 3 is subjected to image recognition processing in an image recognition circuit 4. If the object is a two-dimensional barcode, the image recognition circuit 4 detects its contents. If the object is a fingerprint, the image recognition circuit 4 determines whether or not a fingerprint of a user himself registered in advance and read data of the read fingerprint matches with each other. Then, a result of the determination is stored in a memory 8. In addition, a result of the image recognition is displayed on a display device 9 via a CPU 7. An output of the image recognition circuit 4 is inputted in the CPU 7, and an output from a temperature sensor 13 for measuring ambient temperature of the sensor 1 is also inputted in the CPU 7. The temperature sensor 13 is, for example, a circuit capable of detecting a change in a resistance or a change in a band gap voltage. In addition, the temperature sensor 13 may be provided separately from the sensor 1 or may be provided on the same semiconductor chip where the sensor 1 is provided. Moreover, a change in a dark voltage may be detected by the sensor 1 without specifically providing the temperature sensor 13. The CPU 7 sends a control signal to a control circuit 6, and the control circuit 6 controls operations of a drive circuit 5 for driving the sensor 1, the PGA 2, the A/D converter 3, and the LED 11.

Upon determining that the ambient temperature of the sensor 1 is higher than a predetermined temperature according to a temperature detection signal from the temperature sensor 13, the CPU 7 shortens an accumulation time Ts of the sensor 1 via the control circuit 6 in order to reduce an influence of a dark current. When the external light 10 is weak and then the accumulation time results in underexposure, the LED 11 is turned on in addition to the external light 10 to increase an exposure amount. At this point, since the external light 10 is weak, a light amount of the LED 11 is increased. When the external light 10 is strong, the LED 11 is turned on, but its light amount is reduced.

Also, upon determining that the ambient temperature of the sensor 1 is equal to or lower than a predetermined temperature according to a temperature detection signal from the temperature sensor 13, the CPU 7 extends an accumulation time Ts of the sensor 1 via the control circuit 6. When the external light 10 is strong and then by extending the accumulation time results in overexposure, the LED 11 is turned off. When the external light 10 is weak, the LED 11 is turned on, but since the accumulation time is long, its light amount is reduced.

Here, whether the external light 10 is strong or weak may be determined using a signal obtained from the sensor 1 in preliminary exposure. Alternatively, by providing a photometric sensor, it may be determined using a signal obtained from the photometric sensor.

TABLE 1

| | | External light | |
|---|---|---|---|
| | | Strong | Weak |
| Temperature | High | Ts is shorter, LED is weaker | Ts is shorter, LED is stronger |
| | Low | Ts is longer, LED is off | Ts is longer, LED is weak |

As described above, setting of reading sensitivity (the light amount of the LED, the accumulation time Ts) is changed based on ambient temperature. The above description is summarized in the form of Table 1. Note that the gain of the PGA 2 may be controlled in addition to control of the light amount of the LED.

Figure 2:
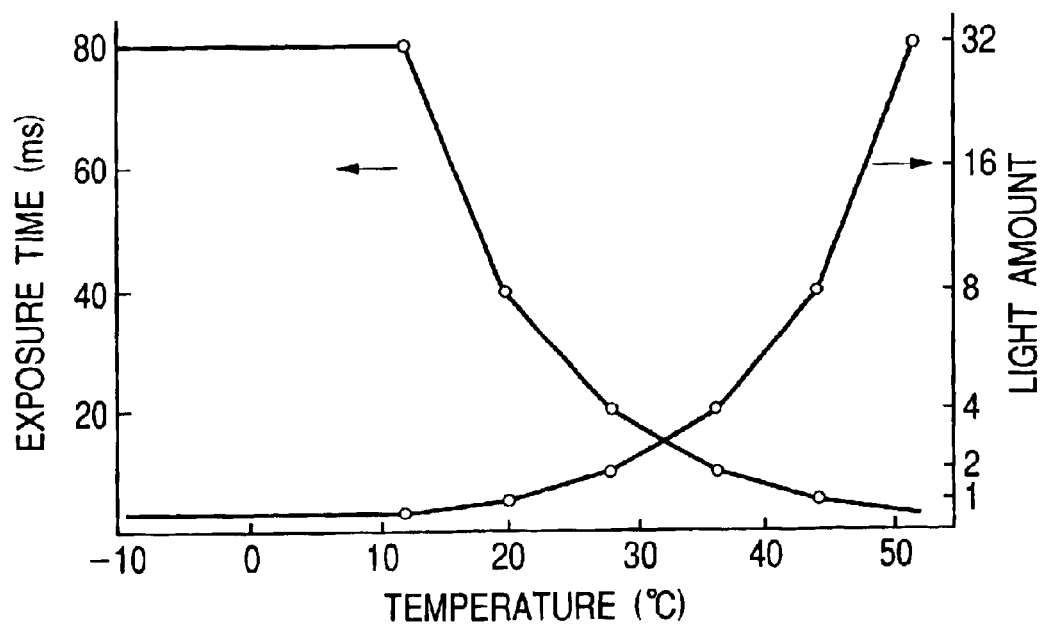
FIG. 2 is a characteristic diagram showing a relationship of an exposure time and a light amount with respect to temperature, which indicates an operation of the image processing apparatus.
Figure 3:
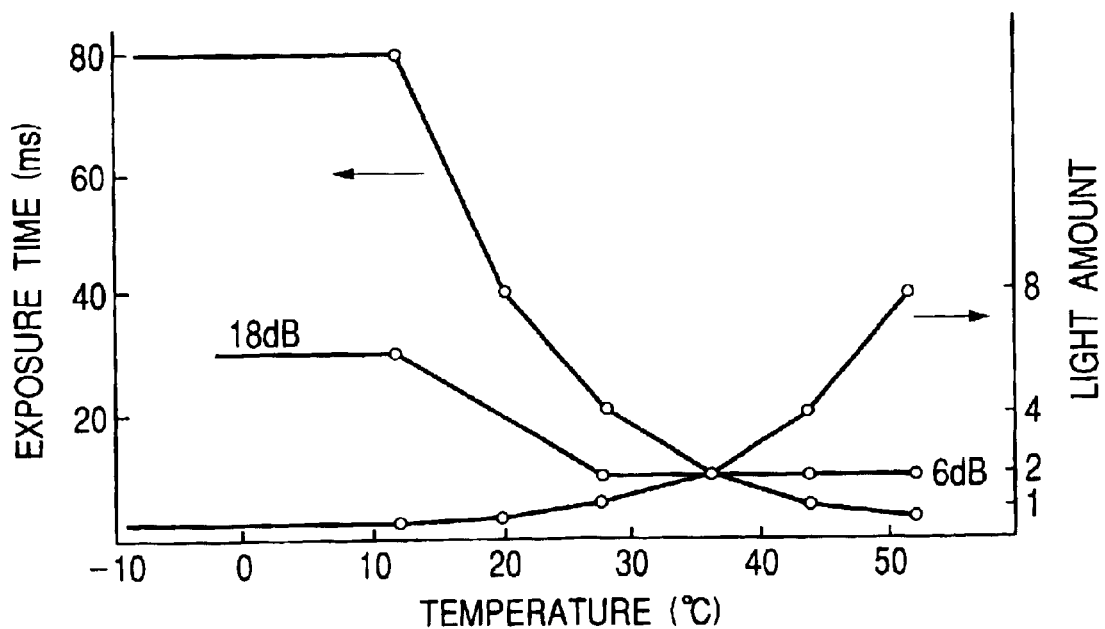
FIG. 3 is a characteristic diagram showing a relationship of an exposure time, a light amount, and a gain with respect to temperature, which indicates an operation of the image processing apparatus.

FIG. 2 is a characteristic diagram showing a relationship of an exposure time and a light amount with respect to temperature, which indicates an operation of the image processing apparatus. FIG. 3 is a characteristic diagram showing a relationship of an exposure time, a light amount, and a gain with respect to temperature, which indicates an operation of the image processing apparatus. When ambient temperature of the sensor 1 is high, an SN ratio deteriorates because a dark current of the sensor 1 increases. In order to increase the SN ratio to a range in which authentication judgment is possible, an accumulation time of the sensor 1 is shortened to reduce the dark current. As means for attaining this, a rotary shutter is used. If the temperature is high, the accumulation time is further shortened. Since the light amount becomes insufficient when the accumulation time is shortened, an applied voltage of the LED 11 is increased or the number of turned-on LEDs is increased to secure the light amount.

If the temperature is low in FIG. 3, since dark current noises are less, the gain of the PGA 2 is set large. Thus, the light amount of the LED 11 can be reduced. If the temperature is high, the gain of the PGA 2 is lowered in order to reduce the influence of the dark current. However, less light amount may be used because the gain is set higher compared with FIG. 2. Thus, a consumed current of the LED 11 can be reduced.

Next, control of the accumulation time (exposure time) will be described.

Figure 4:
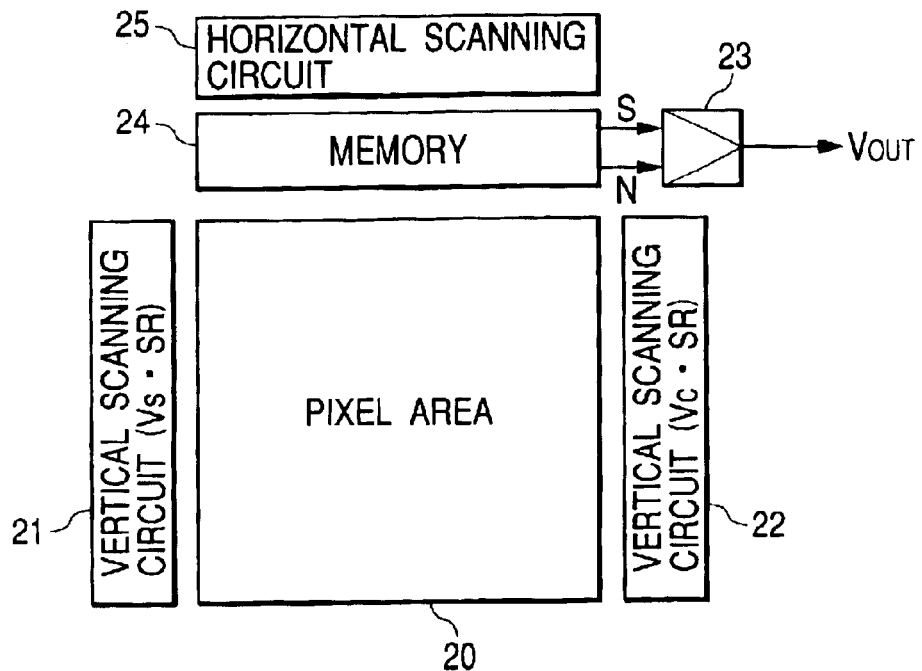
FIG. 4 is a block diagram showing a structure of a sensor.
Figure 5:
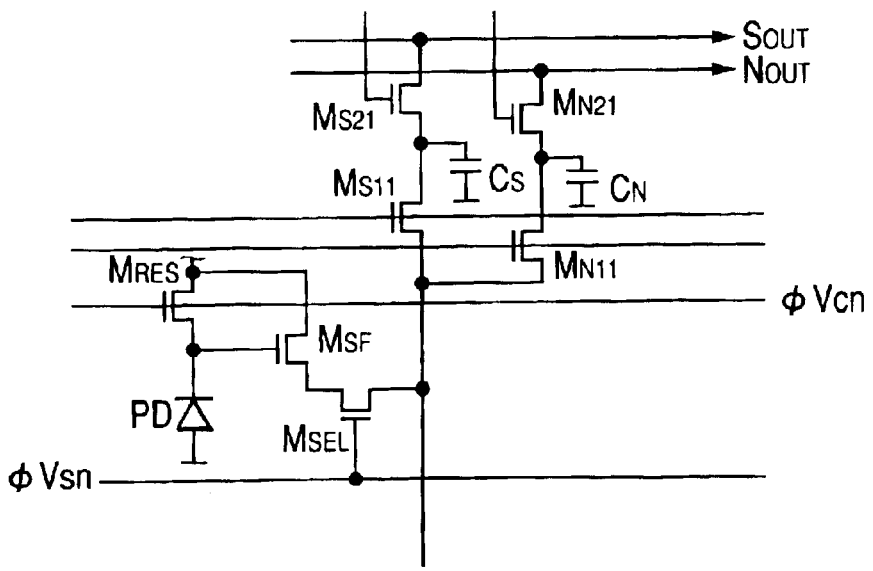
FIG. 5 is a circuit diagram showing a structure of one pixel in a pixel area of the sensor.

FIG. 4 is a block diagram showing a structure of the sensor 1. FIG. 5 is a circuit diagram showing a structure of one pixel in a pixel area of the sensor 1.

In FIG. 4, reference numeral 20 denotes a pixel area with a plurality of pixels arranged therein; 21, a first vertical scanning circuit (Vs·SR) such as a shift register for sequentially selecting a pixel row to be read out; 22, a second vertical scanning circuit (Vc·SR) such as a shift register for sequentially resetting the pixel row in order to start accumulation; 23, a differential amplifier for differentiating (subtracting) a noise signal from a sensor signal to output an output signal Vout; 24, a memory for storing a noise signal and a sensor signal from the pixel area 20; and 25, a horizontal scanning circuit for scanning the memory 24 for each pixel in order to output the noise signal and the sensor signal to the differential amplifier 23 from the memory 24.

As shown in FIG. 5, one pixel of the pixel area 20 consists of a photodiode PD, an amplification transistor MSF for amplifying to output a signal from a cathode side of the photodiode PD, a selection transistor MSEL for selectively outputting a signal from a pixel, and a reset transistor MRES for resetting the photodiode PD. One pixel column of the memory 24 is constituted by accumulation capacitors CS and CN, transistors MS11 and MN11 for transferring a pixel signal and a noise signal from a pixel to accumulation capacitors CS and CN, and transistors MS21 and MN21 for outputting the pixel signal and the noise signal from the accumulation capacitors CS and CN to a horizontal output line as a pixel signal output Sout and a noise signal Nout.

By setting a signal $\phi Vc$ at an H level, the reset transistor MRES of a predetermined pixel row is turned on and each pixel of the pixel row is simultaneously reset. Then, by setting a signal $\phi Vs$ at an H level, the selection transistor MSEL of a predetermined pixel row is turned on and a pixel signal is outputted to each vertical output line from each pixel of the pixel row. By changing start time of the signal $\phi Vc$ for controlling a reset operation and the signal $\phi Vs$ for controlling signal output, time from the resetting to the signal output, that is, the accumulation time (exposure time) can be controlled. This is also called rolling shutter.

Vth dispersion of the amplification transistor MSF functioning as a pixel amplifier can be removed by differentiating a noise signal from a signal outputted from a pixel. That is, after reading out the signal from the pixel to the accumulation capacitor CS via the transistor MS11, the photodiode PD is reset, and an output signal at this point is read out to the accumulation capacitor CN as a noise signal via the transistor MN11. A signal from the accumulation capacitor CS and a noise signal from the accumulation capacitor CN are read out to each horizontal output line as a pixel signal output Sout and a noise signal Nout via the transistors MS21 and MN21 controlled by the horizontal scanning circuit 25, respectively, and are differentiated by the differential amplifier 26. Consequently, the Vth dispersion can be removed and a high SN ratio can be realized.

Figure 6:
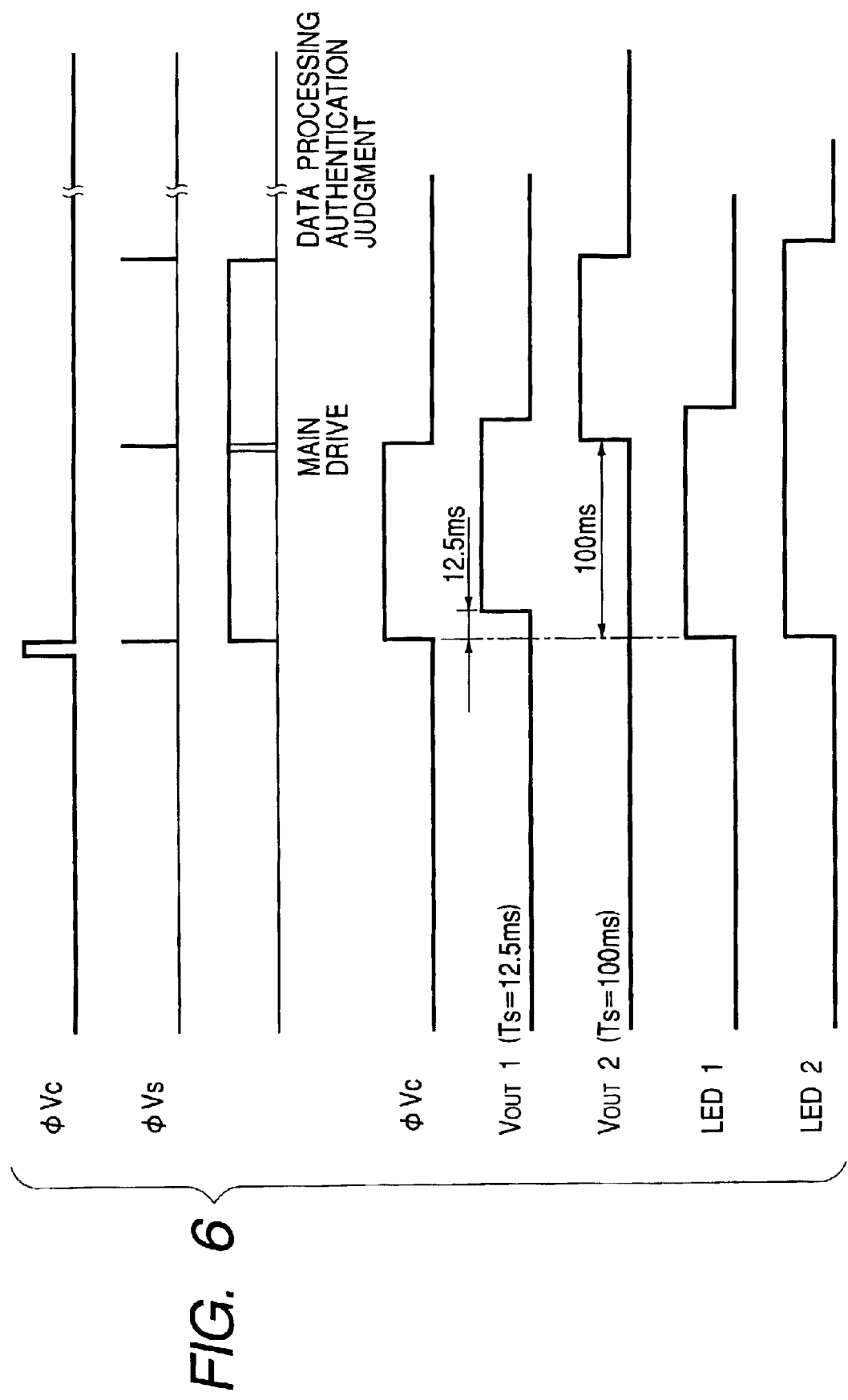
FIG. 6 is a timing chart showing an operation of the sensor.

FIG. 6 is a timing chart showing an operation of the sensor 1. Setting of reading sensitivity (the light amount of the LED, the accumulation time Ts) is changed based on ambient temperature. In addition, the light amount of the LED 11 is controlled and, at the same time, the gain of the PGA 2 is controlled, if necessary. Main drive is performed after determining exposure conditions (accumulation time Ts) and the light amount of the LED 11. Then, data processing and authentication judgment are performed. Exposure time at the time of the main drive can be set according to a scanning interval of the signals φVc and φVs.

Accumulation time of 12.5 msec can be realized by delaying the pixel readout signal φVs by 12.5 msec with respect to the pixel reset signal φVc, and then an output Vout1 is also delayed by 12.5 msec.

Similarly, accumulation time of 100 msec can be realized by delaying the pixel readout signal φVs by 100 msec with respect to the pixel reset signal φVc, and then an output Vout2 is also delayed by 100 msec. The LED 11 continues to be on from the start of exposure (i.e., the time when pixels in a first row are reset) until all accumulation signals are read out (i.e., the time when readout of pixels on a last row is completed). That is, in the case of Vout1, the LED 11 is on for a period of LED1 and, in the case of Vout2, the LED 11 is on for a period of LED2. Alternatively, the LED 11 may be turned on a little before the exposure and may be turned off a little after completing readout of all the pixels. Although the operation of performing resetting and readout for each row is described above, resetting and readout may be performed for each pixel.

In this way, since authentication becomes possible by the main drive after setting reading sensitivity based on ambient temperature, the authentication is performed in a short time and with low power consumption.

As described above, since dark current noises of a sensor can be reduced, authentication of a barcode or a fingerprint can be performed under wide environmental conditions. In addition, since a sensor manufactured by an inexpensive semiconductor process can be used in the image processing apparatus, it becomes possible to mount the image processing apparatus to a portable device that can communicate with other portable terminals as a user of the portable device inputs a predetermined number.

Many widely different embodiments of the present invention may be constructed without departing from the spirit and scope of the present intention. It should be understood that the present invention is not limited to the specific embodiments described in the specification, except as defined in the appended claims.

What is claimed is:

1. An image processing apparatus comprising:
    a sensor unit having a plurality of photoelectric conversion portions for converting light from an object into charges and accumulating the charges;
    a sensor drive circuit arranged to control an accumulation time of the charges in said sensor unit;
    a light source for irradiating light on the object;
    a temperature detection circuit arranged to detect ambient temperature of said sensor unit; and
    a control circuit arranged to control said sensor drive circuit and said light source according to an output of said temperature detection circuit.
    wherein said control circuit has a first mode for performing a control to shorten the accumulation time of the charges in said sensor unit and intensity light from said light source if the ambient temperature is higher than a predetermined temperature and a second mode for performing a control to extend the accumulation time of the charges in said sensor unit and weaken light from said light source if the ambient temperature is lower than the predetermined temperature.

2. An image processing apparatus according to claim 1, wherein the object is a fingerprint, and said apparatus further comprising an image recognition circuit arranged to determining whether or not finger print information registered in advance and fingerprint information from said sensor unit matches with each other.

3. An image processing apparatus according to claim 2, wherein said image processing is a portable terminal that can communicate with other portable terminals when a user of the portable terminal inputs a predetermined number.

4. An image processing apparatus comprising:
    a sensor unit having a plurality of photoelectric conversion portions for converting light from an object into charges and accumulating the charges;
    a sensor drive circuit arranged to control an accumulation time of the charges in said sensor unit;
    a light source for irradiating light on the object;
    a temperature detection circuit arranged to detect ambient temperature of said sensor unit; and
    a control circuit arranged to control said sensor drive circuit and said light source according to an output of said temperature detection circuit,
    wherein said control circuit has first mode for performing a control to shorten the accumulation time of the charges in said sensor unit and turn on said light source if the ambient temperature if higher than a predetermined temperature and a second mode for performing a control to extend the accumulation time of the charges in said sensor unit and turn off said light source if the ambient temperature is lower than the predetermined temperature.

5. An image processing apparatus according to claim 4, wherein the object is a fingerprint, and said apparatus further comprising an image recognition circuit arranged to determining whether or not finger print information registered in advance and fingerprint information from said sensor unit matches each other.

* * * * *

UNITED STATES PATENT AND TRADEMARK OFFICE
CERTIFICATE OF CORRECTION

PATENT NO. : 6,952,002 B2
DATED : October 4, 2005
INVENTOR(S) : Seiji Hashimoto

It is certified that error appears in the above-identified patent and that said Letters Patent is hereby corrected as shown below:

Title page,
Item [56], References Cited, FOREIGN PATENT DOCUMENTS,
"EP    0792066   A2   9/1995" should read -- EP    0792066   A2   8/1997 --.

Column 6,
Line 39, "if" (second occurrence) should read -- is --.

Signed and Sealed this

Seventh Day of March, 2006

JON W. DUDAS
*Director of the United States Patent and Trademark Office*